(12) United States Patent
Nishida et al.

(10) Patent No.: US 12,204,895 B2
(45) Date of Patent: Jan. 21, 2025

(54) CONTROL METHOD, ANALYSIS DEVICE, AND RECORDING MEDIUM

(71) Applicant: Panasonic Intellectual Property Corporation of America, Torrance, CA (US)

(72) Inventors: Naohisa Nishida, Osaka (JP); Junji Michiyama, Fukuoka (JP); Yuji Unagami, Osaka (JP); Junichiro Soeda, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 38 days.

(21) Appl. No.: 17/876,982

(22) Filed: Jul. 29, 2022

(65) Prior Publication Data

US 2022/0365925 A1    Nov. 17, 2022

Related U.S. Application Data

(63) Continuation of application No. PCT/JP2021/005118, filed on Feb. 10, 2021.

(60) Provisional application No. 62/979,680, filed on Feb. 21, 2020.

(51) Int. Cl.
| | | |
|---|---|---|
| G06F 9/44 | (2018.01) | |
| G06F 8/53 | (2018.01) | |
| G06F 8/75 | (2018.01) | |
| G06F 16/23 | (2019.01) | |
| G06F 16/27 | (2019.01) | |

(52) U.S. Cl.
CPC .............. G06F 8/75 (2013.01); G06F 8/53 (2013.01); G06F 16/2379 (2019.01); G06F 16/27 (2019.01)

(58) Field of Classification Search
CPC ........ G06F 8/75; G06F 16/27; G06F 16/2379; G06F 8/53; G06F 3/067; G06F 16/182; G06F 16/245; G06F 11/1464; G06F 2201/80; G06F 16/252; G06F 16/21; G06F 16/284; G06F 16/211; G06F 16/214; G06F 16/28; G06F 16/144
See application file for complete search history.

(56) References Cited

U.S. PATENT DOCUMENTS

2020/0151715 A1    5/2020  Sato et al.
2020/0394709 A1*  12/2020  Cella ...................... G06F 18/22
(Continued)

FOREIGN PATENT DOCUMENTS

| | | |
|---|---|---|
| SG | 11201913750 T | 1/2020 |
| WO | 2019/003414 | 1/2019 |
| WO | 2019/021792 | 1/2019 |

*Primary Examiner* — Chuck O Kendall
(74) *Attorney, Agent, or Firm* — Wenderoth, Lind & Ponack, L.L.P.

(57) ABSTRACT

A control method of an analysis device includes analyzing a binary code of each of a plurality of smart contracts stored in a first distributed ledger; obtaining, by using a result of the analyzing, items of commonization information expressing, in a common format, items of information provided by the plurality of smart contracts; and generating transaction data that includes the items of commonization information obtained and performing control of storing the transaction data generated into a second distributed ledger.

11 Claims, 15 Drawing Sheets

(56) References Cited

U.S. PATENT DOCUMENTS

2021/0182996 A1* 6/2021 Cella ................ G06Q 10/06316
2022/0036302 A1* 2/2022 Cella .................. G06Q 10/0834

* cited by examiner

FIG. 2

Contract code of contract concluding process with Company A    C1

```
(Solidity for Ethereum)

contract ContractA{
    uint value;
    constructor(uint v){
        value = v;
    }
    function setValue(uint v){
        value = v;
    }
    function getValue() constant returns (uint){
        return value;
    }
}
```

FIG. 3

Contract code of contract concluding process with Company B    C2

```
(Go for Hyperledger Fabric)

package ContractB var value uint32 func setValue(v uint32){
    value = v
}
func getValue() (uint){
    return value
}
```

FIG. 8

Function table

| Information provided | Name of providing function |
|---|---|
| Price | getValue, getPrice, getReward, getFee |
| Agreed date of delivery | getTime, getDate |

FIG. 9

Template of commonization code

```
contract Contract%%%{
    uint $$$;
    constructor(uint v){
        $$$ = v;
    }
    function setValue(uint v){
        $$$ = v;
    }
    function getValue() constant returns (uint){
        return $$$;
    }
}
```

FIG. 10

Language table

| Name of ledger network | Programming language |
|---|---|
| Ledger network 20 | Solidity |
| Ledger network 30 | Go |

FIG. 11

Conversion table

| Code in Solidity | Code in Go |
|---|---|
| Contract ###{} | package ### |
| uint###; | var### uint |
| function ### | func### |
| constant | (Delete) |
| returns | (Delete) |

FIG. 12

Commonization information

| Seller | Price [yen] | Address of smart contract |
|---|---|---|
| Company A | 100 | 0xabcd... |
| Company B | 110 | 0xef01... |

FIG. 13

Commonization code of contract concluding process with Company A    C3

```
contract ContractA1{
    uint value;
    constructor(uint v){
        value = v;
    }
    function setValue(uint v){
        value = v;
    }
    function getValue() constant returns (uint){
        return value;
    }
}
```

FIG. 14

Commonization code of contract concluding process with Company B    C4

```
contract ContractB1{
    uint price;
    constructor(uint v){
        price = v;
    }
    function setValue(uint v){
        price = v;
    }
    function getValue() constant returns (uint){
        return price;
    }
}
```

FIG. 15
Address list
| Seller | Address of smart contract |
|---|---|
| Company A | 0x1bcd... |
| Company B | 0x1f01... |
FIG. 16
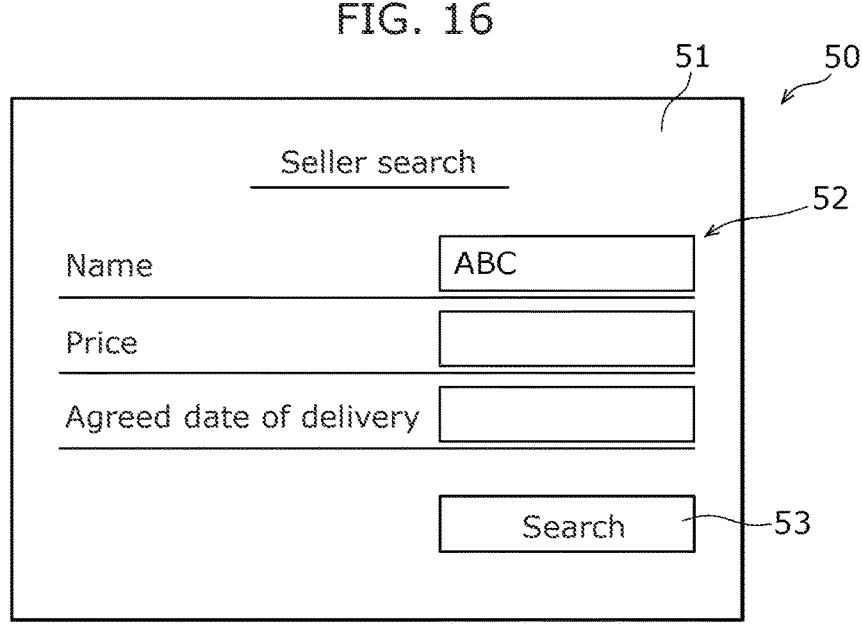
FIG. 17
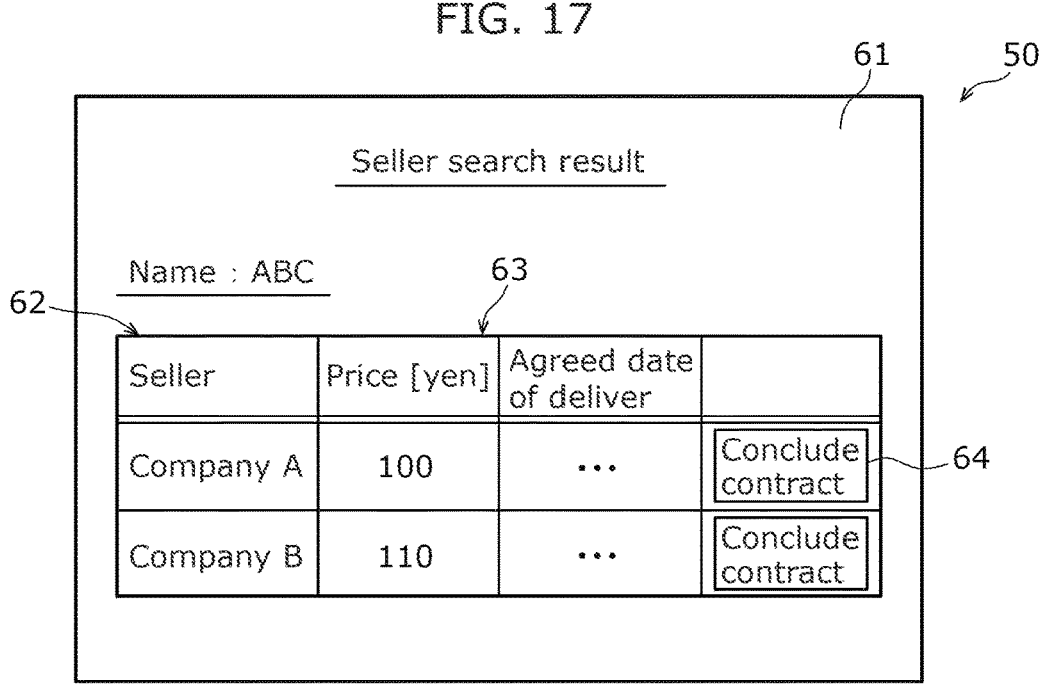

FIG. 18

Seller search result

| Seller | Commonization code | |
|---|---|---|
| Company A | `contract ContractA{`<br>　　`uint value;`<br>　　`constructor(uint v){`<br>　　　　`value = v;`<br>　　`}`<br>　　`function setValue(uint v){`<br>　　　　`value = v;`<br>　　`}`<br>　　`function getValue() constant returns (uint){`<br>　　　　`return value;`<br>　　`}`<br>`}` | Conclude contract |
| Company B | `contract ContractB{`<br>　　`uint price;`<br>　　`constructor(uint v){`<br>　　　　`price = v;`<br>　　`}`<br>　　`function setValue(uint v){`<br>　　　　`price = v;`<br>　　`}`<br>　　`function getValue() constant returns (uint){`<br>　　　　`return price;`<br>　　`}`<br>`}` | Conclude contract |

CONTROL METHOD, ANALYSIS DEVICE, AND RECORDING MEDIUM

CROSS REFERENCE TO RELATED APPLICATIONS

This is a continuation application of PCT International Application No. PCT/JP2021/005118 filed on Feb. 10, 2021, designating the United States of America, which is based on and claims priority of U.S. Provisional Patent Application No. 62/979680 filed on Feb. 21, 2020. The entire disclosures of the above-identified applications, including the specifications, drawings and claims are incorporated herein by reference in their entirety.

FIELD

The present disclosure relates to a control method, an analysis device, and a recording medium.

BACKGROUND

In one existing technology, information pertaining to a contract is managed by use of a distributed ledger. Such information stored in the distributed ledger is managed so as to be virtually immutable.

There is disclosed a technique of aligning an operation policy or an operation timing in a system that uses a distributed ledger (for example, Patent Literature (PTL) 1).

CITATION LIST

Patent Literature

PTL 1: International Patent Publication No. 2019/021792

SUMMARY

Technical Problem

The present disclosure provides a control method and others that suppress an increase in power consumed by a computer system that manages a contract.

Solution to Problem

A control method according to one aspect of the present disclosure includes: analyzing a binary code of each of a plurality of smart contracts stored in a first distributed ledger; obtaining, by using a result of the analyzing, items of commonization information expressing, in a common format, items of information provided by the plurality of smart contracts; and generating transaction data that includes the items of commonization information obtained and performing control of storing the transaction data generated into a second distributed ledger.

It is to be noted that general or specific aspects of the above may be implemented in the form of a system, an apparatus, an integrated circuit, a computer program, or a computer-readable recording medium, such as a CD-ROM, or through any desired combination of a system, an apparatus, an integrated circuit, a computer program, and a recording medium.

Advantageous Effects

The control method according to the present disclosure can suppress an increase in power consumed by a computer system that manages a contract.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is an explanatory diagram illustrating a first example of a contract code according to one exemplary embodiment.

FIG. 3 is an explanatory diagram illustrating a second example of a contract code according to one exemplary embodiment.

FIG. 8 is an explanatory diagram illustrating an example of a function table according to one exemplary embodiment.

FIG. 9 is an explanatory diagram illustrating an example of a template of a commonization code according to one exemplary embodiment.

FIG. 10 is an explanatory diagram illustrating an example of a language table according to one exemplary embodiment.

FIG. 11 is an explanatory diagram illustrating an example of a conversion table according to one exemplary embodiment.

FIG. 12 is an explanatory diagram illustrating an example of commonization information according to one exemplary embodiment.

FIG. 13 is an explanatory diagram illustrating a first example of a commonization code according to one exemplary embodiment.

FIG. 14 is an explanatory diagram illustrating a second example of a commonization code according to one exemplary embodiment.

FIG. 15 is an explanatory diagram illustrating an example of an address list according to one exemplary embodiment.

FIG. 16 is an explanatory diagram illustrating an example of an image for performing a search according to one exemplary embodiment.

FIG. 17 is an explanatory diagram illustrating a first example of an image for displaying a search result according to one exemplary embodiment.

FIG. 18 is an explanatory diagram illustrating a second example of an image for displaying a search result according to one exemplary embodiment.

DESCRIPTION OF EMBODIMENT

Underlying Knowledge Forming Basis of the Present Disclosure

The present inventors have found the following problem with regard to the technique related to a contract described in the Background section.

There exists a technology of managing information pertaining to a contract by use of a distributed ledger. Such information stored in the distributed ledger is managed so as to be virtually immutable. There also exists a technology of managing a contract by executing a process pertaining to the contract by use of a distributed ledger. Such a technology may be implemented, for example, by a smart contract.

In one conceivable case, there may be a plurality of contracts that a user can conclude to fulfill his or her purpose, and the user may select a contract to conclude from that plurality of contracts.

For example, there may be a plurality of sellers who sell an article that the user wants to purchase. In this case, the user concludes a sales and purchase contract with one of the plurality of sellers in order to fulfill the purpose of purchasing the article. In other words, the user selects a sales and purchase contract to conclude from a plurality of sales and purchase contracts.

In another conceivable case, a contract may be implemented though a contract concluding process executed by a smart contract by use of distributed ledger technology.

Figure 1:
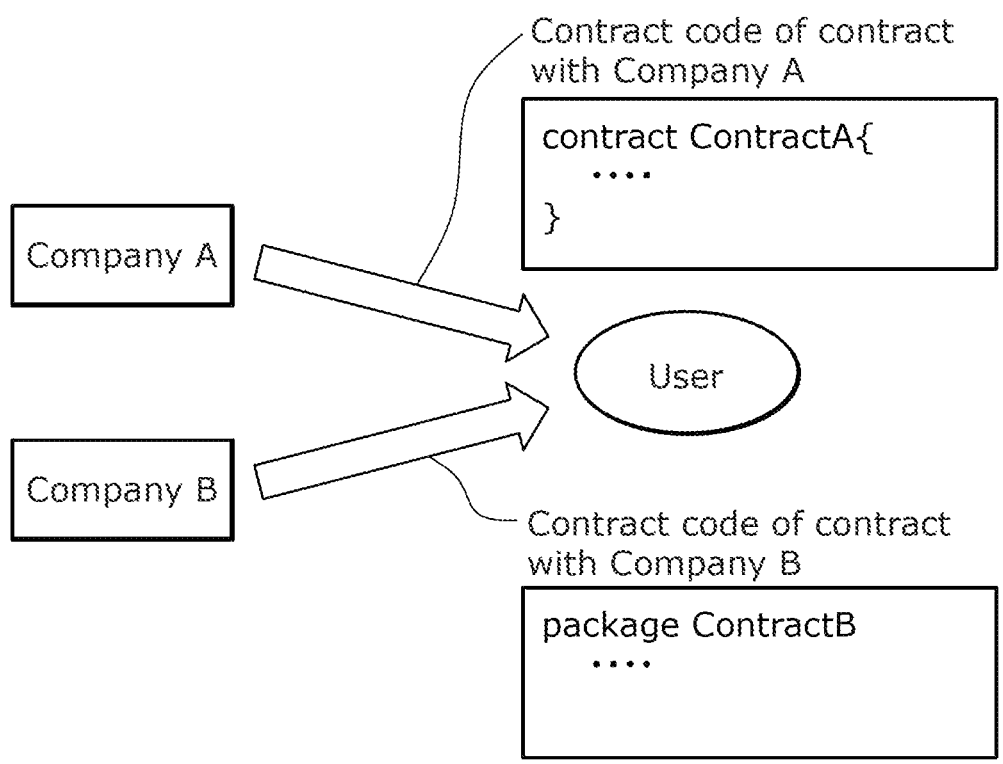
FIG. 1 is an explanatory diagram schematically illustrating a contract according to one exemplary embodiment.

FIG. 1 is an explanatory diagram schematically illustrating some contracts according to the present embodiment. Each contract is, for example, a sales and purchase contract.

The user indicated in FIG. 1 is to select either a sales and purchase contract with Company A or a sales and purchase contract with Company B and conclude the selected contract. The sales and purchase contract with Company A and the sales and purchase contract with Company B are each implemented through a contract concluding process executed by a smart contract.

Sales and purchase contracts of different sellers may typically have different contract terms (e.g., the price of an article, the agreed date of delivery, the quality, the shipping or handling charge, etc.). The user selects a seller that suits his or her preference by comparing and considering the contract terms and concludes a sales and purchase contract with the selected seller. For example, with regard to the price of an article, the seller that sells the article at a price within a price range that the user considers is fair is the seller that suits his or her preference. Alternatively, of a plurality of sellers, the seller that sells the article at the lowest price may be the seller that suits the user's preference.

Yet, algorithms within a plurality of smart contracts typically differ from each other, and contract codes of a plurality of smart contracts also typically differ from each other. Algorithms within a plurality of smart contracts are designed as desired and thus may differ between different designs even when these algorithms provide the same function. Meanwhile, contract codes of a plurality of smart contracts may be written in different programming languages, and the functions describing a sales and purchase contract in these contract codes may have different names.

Such a case makes it difficult for the user to compare these contract codes when the user is to select a contract to conclude from a plurality of contracts, which in turn may make it difficult to determine a smart contract to be selected. This difficulty in determining a smart contract that the user should select may increase the time the user needs to make a decision, or cause the user to quit selecting a contract as the user is unable to decide on a contact even after spending a lot of time comparing the contracts. In this case, power consumed by a computer system implementing the distributed ledger or by a computer that the user uses may increase, resulting in unnecessary power consumption.

The present disclosure provides a control method and others that suppress an increase in power consumed by a computer system managing a contract.

According to an exemplary embodiment disclosed herein, a control method includes analyzing a binary code of each of a plurality of smart contracts stored in a first distributed ledger; obtaining, by using a result of the analyzing, items of commonization information expressing, in a common format, items of information provided by the plurality of smart contracts; and generating transaction data that includes the items of commonization information obtained and performing control of storing the transaction data generated into a second distributed ledger.

According to the aspect above, even in a case where the algorithms within a plurality of smart contracts differ from each other or even in a case where the contract codes in a plurality of smart contracts are written in different programming languages, commonization information obtained by analyzing the algorithms or the contract codes is stored into the distributed ledger. Commonization information is information that indicates, in a common format, information provided by a smart contract. When the user views the commonization information of each of the plurality of smart contracts, the user can compare and consider the contents of the contracts with ease and can thus select a contract to conclude, that is, select a smart contract with ease. With this configuration, an increase in power consumed by a computer system or the like that implements the distributed ledger can be suppressed, and an occurrence of unnecessary power consumption can be suppressed. In this manner, the control method described above can suppress an increase in power consumed by a computer system that manages a contract.

The analyzing may include causing functions in the plurality of smart contracts to be executed, and the obtaining of the items of commonization information may include obtaining, as the items of commonization information, items of information provided by the functions executed.

According to the aspect above, functions that are included in the plurality of smart contracts and that provide information are actually executed, and with the use of the information obtained upon the execution, commonization information is generated. Therefore, the commonization information is generated more easily. With this configuration, an increase in power consumed by a computer system that manages a contract can be suppressed more easily.

Moreover, the analyzing may include extracting, from functions in plurality of the smart contracts, a function having a name determined in advance as a name of a function with a relatively high probability of providing the information, and causing the function extracted to be executed.

According to the aspect above, a function with a relatively high probability of providing information is extracted from the functions in the plurality of smart contracts, and commonization information is generated by use of the information obtained by executing the extracted function. Since a function with a relatively high probability of providing information is used, commonization information is generated more efficiently. With this configuration, an increase in power consumed by a computer system that manages a contract can be suppressed more efficiently.

The analyzing may include obtaining a plurality of source codes by disassembling the binary codes of the plurality of smart contracts, and the obtaining of the items of commonization information may include obtaining, as the items of commonization information, a plurality of commonization codes expressing, in a common format, the plurality of source codes obtained.

According to the aspect above, commonization codes that are commonization information are obtained by use of source codes obtained by disassembling the binary codes of the plurality of smart contracts. With this configuration, commonization information can be obtained by use of a binary code that can be obtained easily from a distributed ledger. In other words, commonization information can be obtained without an original source code of a smart contract or without executing a function in a smart contract. Accordingly, an increase in power consumed by a computer system that manages a contract can be suppressed more easily.

The obtaining of the items of commonization information may include obtaining the plurality of commonization codes by converting the plurality of source codes obtained, in accordance with a predetermined code conversion rule.

According to the aspect above, a commonization code is obtained through the code conversion of a source code obtained from a binary code that can be obtained from the distributed ledger. Therefore, a commonization code can be obtained more easily. Accordingly, an increase in power consumed by a computer system that manages a contract can be suppressed more easily.

The generating of the transaction data may include generating the transaction data that includes the items of commonization information in a format in which, for each of the plurality of smart contracts, an identifier of the smart contract is associated with, among the items of commonization information, commonization information pertaining to the smart contract.

According to the aspect above, commonization information of each of the plurality of smart contracts can be stored into the distributed ledger with the commonization information incorporated in transaction data. Therefore, commonization information is managed in a browsable state and in a manner that makes the commonization information virtually inalterable. Accordingly, an increase in power consumed by a computer system that manages a contract can be suppressed while the commonization information is managed appropriately.

The generating of the transaction data may include generating the transaction data that includes the items of commonization information in a format in which, for each of the plurality of smart contracts, an identifier of the smart contract is associated with, among the plurality of commonization codes, a commonization code pertaining to the smart contract.

According to the aspect above, commonization codes of the plurality of smart contracts are stored into the distributed ledger with the commonization codes incorporated into transaction data. Therefore, the commonization codes are managed in a browsable state and in a manner that makes the commonization codes virtually inalterable. Moreover, the smart contracts concerning the commonization codes can be executed in a server that manages the distributed ledger. Accordingly, an increase in power consumed by a computer system that manages a contract can be suppressed while the commonization information is managed appropriately.

The control method may further include causing the transaction data stored in the second distributed ledger to be read out; and causing the items of commonization information pertaining to the plurality of smart contracts to be displayed.

According to the aspect above, the contents of the transaction data stored in the distributed ledger and including the commonization information are displayed. This configuration allows the user to view the commonization information pertaining to each of the plurality of smart contracts via the display on a device and to compare and consider the contents of the contracts with ease. Thus, the above configuration can contribute to the reduction of time that the user spends using a computer system. Accordingly, an increase in power consumed by a computer system that manages a contract can be suppressed even further.

Each of the plurality of smart contracts may correspond to a contract concluding process, and the control method may further include causing, for each of the plurality of smart contracts, a button to be displayed that causes the contract concluding process associated with the smart contract to be executed.

According to the aspect above, the user who has viewed the commonization information and compared and considered the contents of the contracts can perform an operation of causing a contract concluding process to be executed via the device. Since the user who has decided on an appropriate contract can perform the process of concluding that appropriate contract via the device, this configuration can contribute to the reduction of time that the user spends using a computer system. Accordingly, an increase in power consumed by a computer system that manages a contract can be suppressed even further.

The control method may further include, in response to obtaining operation information indicating that the button has been operated on, causing the contract concluding process corresponding to the smart contract associated with the button to be executed.

According to the aspect above, the contract concluding process is actually executed based on the user's operation for executing the contract concluding process. With this configuration, the process from the user's operation to the contract concluding process is performed automatically, that is, the process is performed without any human intervention. Therefore, the contract concluding process can be performed in a shorter time while keeping the information from being altered. Accordingly, an increase in power consumed by a computer system that manages a contract can be suppressed even further.

According to an exemplary embodiment disclosed herein, an analysis device includes an analyzer, a commonizer, and an outputter. The analyzer performs an analysis of a binary code of each of a plurality of smart contracts stored in a first distributed ledger. The commonizer obtains, by using a result of the analysis, items of commonization information expressing, in a common format, items of information provided by the plurality of smart contracts. The outputter generates transaction data that includes the items of commonization information obtained and performs control of storing the transaction data generated into a second distributed ledger.

The aspect above provides advantageous effects similar to those of the control method described above.

According to an exemplary embodiment disclosed herein, a recording medium is a non-transitory computer-readable recording medium having recorded thereon a computer program for causing a computer to execute the control method described above.

The aspect above provides advantageous effects similar to those of the control method described above.

It is to be noted that these general or specific aspects may be implemented in the form of a system, an apparatus, an integrated circuit, a computer program, or a computer-readable recording medium, such as a CD-ROM, or through any desired combination of a system, an apparatus, an integrated circuit, a computer program, and a recording medium.

Hereinafter, an exemplary embodiment will be described in concrete terms with reference to the drawings.

It is to be noted that the exemplary embodiment described below merely illustrates a general or specific example. The numerical values, the shapes, the materials, the constituent elements, the arrangement positions and the connection modes of the constituent elements, the steps, the orders of the steps, and so on illustrated in the following exemplary embodiment are examples and are not intended to limit the present disclosure. Among the constituent elements in the following exemplary embodiment, any constituent element that is not included in the independent claim expressing the broadest concept is to be construed as an optional constituent element.

Embodiment

A contract managing system that suppresses an increase in power consumed by a computer system that manages a contract, a method of controlling the contract managing system, and so on will be described in accordance with the present embodiment.

In an example described according to the present embodiment, a user selects a contract to conclude from a plurality of contracts (e.g., a sales and purchase contract with Company A and a sales and purchase contract with Company B) and concludes the selected contract, as illustrated in FIG. 1. In this example described below, the party with which the user is to conclude a contract is one of two sellers: Company A and Company B. The number of such sellers may be greater than two. The user may conclude a contract with more than one seller. A seller does not have to be a company and may instead be an individual.

The aforementioned plurality of contracts may each be implemented by a process executed by a smart contract. The contract code of the smart contract describing the process pertaining to the contract with Company A and the contract code of the smart contract describing the process pertaining to the contract with Company B are written in different programming languages.

FIG. 2 and FIG. 3 are explanatory diagrams illustrating some examples of contract codes according to the present embodiment.

The contract code illustrated in FIG. 2 is an example of a contract code describing the process pertaining to the contract with Company A and is written in the Solidity language. The contract code in FIG. 2 includes a function for setting a value to a variable (setValue function) and a function for reading out and outputting the value of a variable (getValue function).

The contract code illustrated in FIG. 3 is an example of a contract code describing the process pertaining to the contract with Company B and is written in the Go language. The contract code in FIG. 3 includes a function for setting a value to a variable (setValue function) and a function for reading out and outputting the value of a variable (getValue function).

As illustrated in FIG. 2 and FIG. 3, the contract code describing the process pertaining to the contract with Company A and the contract code describing the process pertaining to the contract with Company B differ from each other in how they define their setValue functions and getValue functions. Moreover, these contract codes differ from each other in how they describe their functions. Specifically, these contract codes differ from each other in terms of, for example but not limited to, the keyword placed before the function name, the presence or absence of a symbol or symbols at the end of a statement, or the presence or absence of parentheses. Therefore, even if the user obtains these two contract codes, the user cannot simply compare the two contract codes, and this situation makes it difficult for the user to select a contract to conclude.

Figure 4:
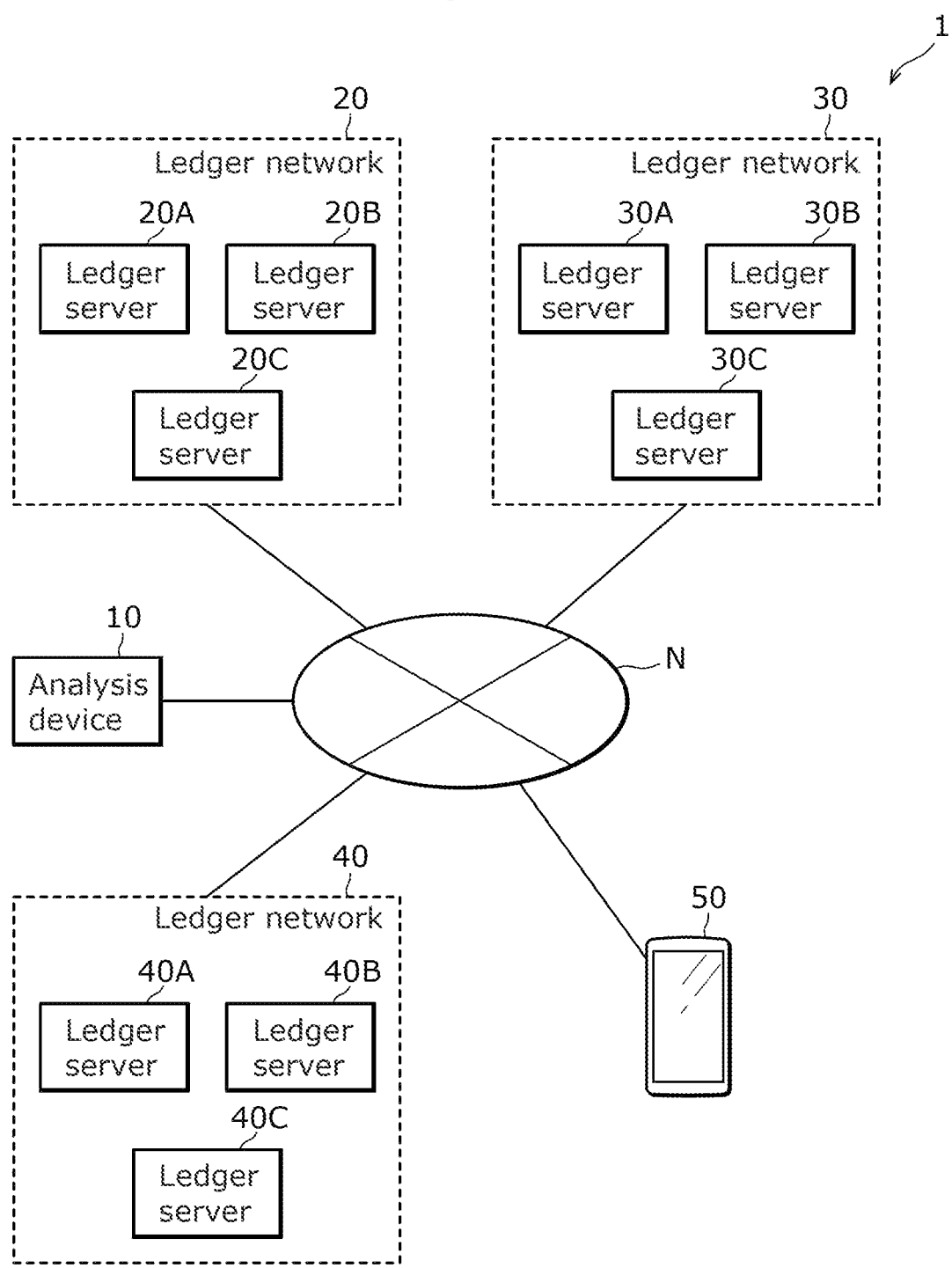
FIG. 4 is a block diagram schematically illustrating a configuration of a contract managing system according to one exemplary embodiment.

FIG. 4 is a block diagram schematically illustrating a configuration of contract managing system 1 according to the present embodiment.

As illustrated in FIG. 4, contract managing system 1 includes analysis device 10 and ledger networks 20, 30, and 40. Analysis device 10 and ledger networks 20, 30, and 40 are connected directly or indirectly to network N and can communicate with each other via network N. Network N also connects terminal 50 to contract managing system 1.

Network N may be formed by any communication circuit or network, and examples of such communication circuits or networks may include the internet, a mobile phone carrier's network, an access network of an internet service provider, or a public access network.

Analysis device 10 is a device that analyzes a plurality of smart contracts and outputs commonization information pertaining to the plurality of smart contracts. The plurality of smart contracts that analysis device 10 is to analyze include a smart contract that performs the process pertaining to the contract with Company A and a smart contract that performs the process pertaining to the contract with Company B.

Ledger network 20 is a P2P network that stores and manages a distributed ledger. The distributed ledger that ledger network 20 manages stores the smart contract that performs the process pertaining to the contract with Company A.

Ledger network 20 includes ledger servers 20A, 20B, and 20C (also referred to as ledger server 20A and others), and ledger servers 20A, 20B, and 20C each serve as a node in the P2P network. Ledger server 20A and others will be described later in detail. The number of ledger servers that ledger network 20 includes is not limited to three, and ledger network 20 may include more than three ledger servers.

Ledger network 30 is a P2P network that stores and manages a distributed ledger. The distributed ledger that ledger network 30 manages stores the smart contract that performs the process pertaining to the contract with Company B.

Ledger network 30 includes ledger servers 30A, 30B, and 30C (also referred to as ledger server 30A and others), and ledger servers 30A, 30B, and 30C each serve as a node in the P2P network. Ledger server 30A and others will be described later in detail. The number of ledger servers that ledger network 30 includes is not limited to three, and ledger network 30 may include more than three ledger servers.

Ledger network 40 is a P2P network that stores and manages a distributed ledger. The distributed ledger that ledger network 40 manages stores commonization information output by analysis device 10.

Ledger network 40 includes ledger servers 40A, 40B, and 40C (also referred to as ledger server 40A and others), and ledger servers 40A, 40B, and 40C each serve as a node in the P2P network. Ledger server 40A and others will be described later in detail. The number of ledger servers that ledger network 40 includes is not limited to three, and ledger network 40 may include more than three ledger servers.

Terminal 50 is a terminal device that presents commonization information output by analysis device 10 and receives an operation pertaining to the user's selection of a contract. By using terminal 50, the user can view information pertaining to the contract with Company A and the contract with Company B. Based on the information presented by terminal 50, the user can select a seller with which the user is to conclude a contract.

Figure 5:
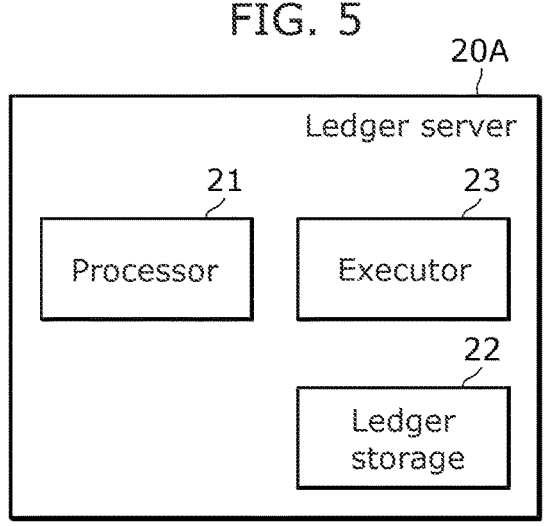
FIG. 5 is a block diagram illustrating a functional configuration of a ledger server according to one exemplary embodiment.

FIG. 5 is a block diagram illustrating a functional configuration of ledger server 20A according to the present embodiment. In the following description, ledger server 20A serves as a representative of ledger server 20A and others. Ledger servers 20B and 20C each have a function similar to that of ledger server 20A.

As illustrated in FIG. 5, ledger server 20A includes processor 21, ledger storage 22, and executor 23.

Processor 21 is a functional unit that executes a process pertaining to transaction data. Processor 21 may be implemented as a processor (e.g., a central processing unit (CPU)) included in ledger server 20A executes a program with the use of a memory.

Processor 21 executes a process of obtaining transaction data and storing the obtained transaction data into the distributed ledger.

When processor 21 is to store new transaction data into the distributed ledger, processor 21 stores the new transaction data into ledger storage 22 in a scheme suitable for the type of the distributed ledger. Furthermore, processor 21 transmits or receives communication data to or from ledger storage 22 included in another ledger server among ledger server 20A and others and causes that ledger server to store the new transaction data into its ledger storage 22 as well. For example, in a case where the distributed ledger is a blockchain, processor 21 generates a block including the new transaction data, establishes, through a consensus algorithm, a consensus between ledger server 20A and others concerning the generated block, and stores that block into ledger storage 22.

Transaction data that processor 21 stores into the distributed ledger includes the contract code of the smart contract that performs the process pertaining to the contract with Company A (this contract code is also referred to as a contract code corresponding to the contract with Company A).

Ledger storage 22 is a storage that stores the distributed ledger. The distributed ledger stored in ledger storage 22 stores one or more items of transaction data and is managed by use of such features as hash values so that the distributed ledger is hard to alter (this will be described later). Ledger manager 22 stores, into the distributed ledger, transaction data that is provided by processor 21 and includes the contract code corresponding to the contact with Company A.

The distributed ledger stores transaction data from the past to the present. Based on the feature that information recorded in a distributed ledger is hard to alter, the transaction data is managed so as not to be altered.

In this example, the distributed ledger is, for example, a blockchain, and this case will be described as an example below. Alternatively, a distributed ledger of a different scheme (e.g., IOTA, Hashgraph, or the like) can also be employed. The distributed ledger may or may not execute a consensus algorithm (e.g., Practical Byzantine Fault Tolerance (PBFT), Proof of Work (PoK), or Proof of Stake (PoS)) at the time of storing new data. Hyperledger fabric is an example of distributed ledger technology that does not execute a consensus algorithm.

Executor 23 is a functional unit that refers to the transaction data recorded in the distributed ledger stored in ledger storage 22 and executes a process. Executor 23 may be implemented as a processor (e.g., a CPU) included in ledger server 20A executes a program with the use of a memory. Executor 23 executes a process by a smart contract in accordance with a contract code included in transaction data stored in the distributed ledger.

Specifically, when transaction data including a command that causes a smart contract corresponding to the contract with Company A to be executed has become stored in the distributed ledger, executor 23 executes a process pertaining to the contract via the smart contract in accordance with the command.

Ledger server 30A and others each have a function similar to that of ledger server 20A. Transaction data that processor 21 in ledger server 30A and others stores into the distributed ledger includes a contract code of a smart contract that performs the process pertaining to the contract with Company B (this contract code is also referred to as a contract code corresponding to the contract with Company B).

Figure 6:
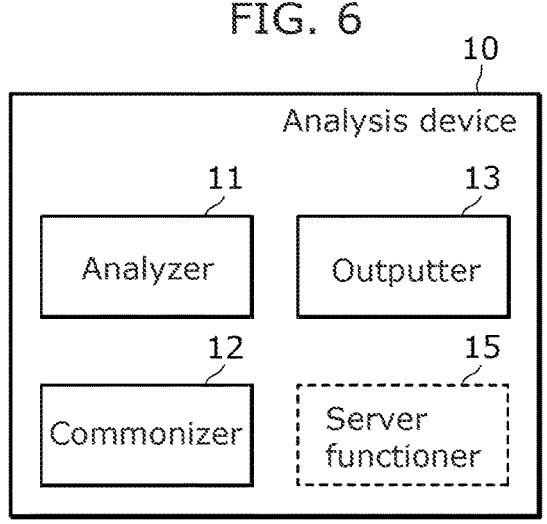
FIG. 6 is a block diagram illustrating a functional configuration of an analysis device according to one exemplary embodiment.

FIG. 6 is a block diagram illustrating a functional configuration of analysis device 10 according to the present embodiment.

As illustrated in FIG. 6, analysis device 10 includes analyzer 11, commonizer 12, and outputter 13. Analysis device 10 may further include server functioner 15.

Each functional unit included in analysis device 10 is implemented as a processor (e.g., a CPU) included in analysis device 10 executes a program with the use of a memory.

Analyzer 11 is a functional unit that analyzes a binary code of each of a plurality of smart contracts stored in a distributed ledger (corresponding to a first distributed ledger). The plurality of smart contracts include a smart contract stored in ledger storage 22 of ledger server 20A serving as an example of the first distributed ledger and a smart contract stored in ledger storage 22 of ledger server 30A serving as another example of the first distributed ledger. Each binary code is analyzed by use of a method in which a function included in each smart contract is executed or a method in which a source code obtained by disassembling the binary code is used. The analysis of a binary code will be elaborated later.

Commonizer 12 is a functional unit that, by use of the result of the analysis performed by analyzer 11, obtains items of commonization information expressing, in a common format, information provided by the respective smart contracts. The items of commonization information are each information that presents information provided by the corresponding smart contract in a predetermined common format. Each item of commonization information may present such information, for example, in a format where the information is shown in a list form (also referred to as a list format) or in a format where the information is shown in the form of a contract code (also referred to as a code format). Information provided by a smart contract is information that executor 23 outputs upon executing a process by the smart contract. This information will be elaborated later.

Outputter 13 is a functional unit that outputs the items of commonization information obtained by commonizer 12. Specifically, outputter 13 generates transaction data that includes the items of commonization information obtained by commonizer 12 and transmits the generated transaction data to the distributed ledger (also referred to as a second distributed ledger) of ledger server 40A and others. By transmitting the transaction data in this manner, outputter 13 controls the storing of the transaction data into the distributed ledger.

Server functioner 15 is a functional unit that has a function of a ledger server. Server functioner 15 has a function of ledger server 20A and others, ledger server 30A and others, or ledger server 40A and others. In a case where server functioner 15 has a function of ledger server 20A, analysis device 10 can participate in ledger network 20 and serve as a node in the P2P network of ledger network 20. This description also applies in a similar manner to ledger server 30A and others and ledger server 40A and others. Server functioner 15 may have functions of a plurality of ledger servers simultaneously. Server functioner 15 is not an essential constituent element.

Analyzer 11 and commonizer 12 can operate as described below in greater detail.

As one example of an analysis, analyzer 11 may cause functions in each of the plurality of smart contracts to be executed. In this case, commonizer 12 obtains information provided by the executed functions as items of commonization information. In this example, analyzer 11 may extract, from functions in the plurality of smart contracts, a function having a name that is determined in advance as a name of a function with a relatively high probability of providing information, and cause the extracted function to be executed. Such a function is also referred to as a providing function.

In executing a providing function, transaction data that includes a command that causes the providing function to be executed needs to be generated, and the generated transaction data needs to be transmitted to the distributed ledger in which the corresponding smart contract is stored and be stored in that distributed ledger.

Moreover, as another example of an analysis, analyzer 11 may obtain a plurality of source codes by disassembling binary codes of the plurality of smart contracts. In this case, commonizer 12 obtains a plurality of commonization codes expressing the obtained plurality of source codes in a common format as items of commonization information. In this example, commonizer 12 may obtain the plurality of commonization codes by converting the plurality of source codes obtained by analyzer 11 in accordance with a predetermined conversion rule.

Meanwhile, outputter 13 can operate as described below in greater detail.

As one example of generating of transaction data, for each of the plurality of smart contracts, outputter 13 may generate transaction data that includes items of commonization information, and this transaction data may be in a format in which an identifier of a given smart contract is associated with, among the items of commonization information, an item of commonization information pertaining to the given smart contract.

Moreover, as another example of generating of transaction data, for each of the plurality of smart contracts, outputter 13 may generate transaction data that includes items of commonization information, and this transaction data may be in a format in which an identifier of a given smart contract is associated with, among the plurality of commonization codes, a commonization code pertaining to the given smart contract.

Furthermore, outputter 13 can perform control of causing various items of information to be displayed on terminal 50 by providing, to terminal 50, display control information that ledger server 40A generates.

For example, outputter 13 can perform control of causing transaction data stored in the distributed ledger in ledger server 40A to be read out and causing commonization information pertaining to each of the plurality of smart contracts to be displayed on terminal 50. In other words, ledger server 40A (display controller 44) reads out transaction data stored in ledger storage 42 and transmits, to terminal 50, display control information for displaying commonization information pertaining to each of the plurality of smart contracts. Terminal 50 receives the display control information and displays the corresponding commonization information based on the received control information.

Moreover, for each of the plurality of smart contracts, outputter 13 can perform control of causing a button for executing a process of concluding a contract that corresponds to a given smart contract (this process is also referred to as a contract concluding process) to be further displayed on terminal 50. In other words, ledger server 40A (display controller 44) transmits, to terminal 50, display control information for displaying the button described above. Terminal 50 receives this display control information and displays the button based on the received display control information. At this point, each of the plurality of smart contracts supports a contract concluding process.

Moreover, in response to terminal 50 obtaining operation information indicating that the button has been operated, outputter 13 can perform control of causing the contract concluding process corresponding to the smart contract associated with the operated button to be executed.

Figure 7:
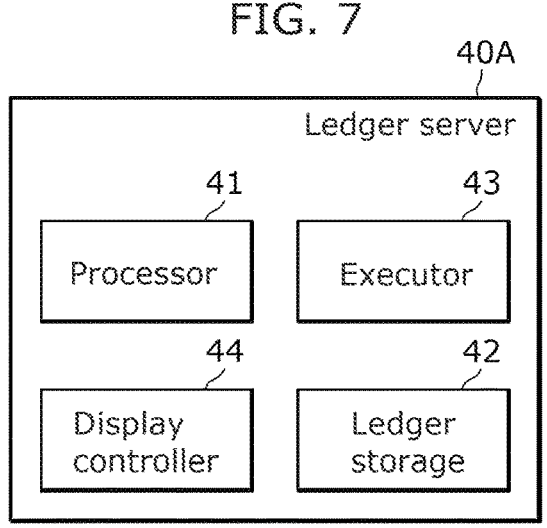
FIG. 7 is a block diagram illustrating a functional configuration of a ledger server according to one exemplary embodiment.

FIG. 7 is a block diagram illustrating a functional configuration of ledger server 40A according to the present embodiment. In the following description, ledger server 40A serves as a representative of ledger server 40A and others. Ledger servers 40B and 40C each have a function similar to that of ledger server 40A.

As illustrated in FIG. 7, ledger server 40A includes processor 41, ledger storage 42, executor 43, and display controller 44.

Processor 41 is a functional unit that executes a process pertaining to transaction data. Processor 41 is similar to processor of ledger server 20A and others. Processor 41 may be implemented as a processor (e.g., a CPU) included in ledger server 40A executes a program with the use of a memory.

Processor 41 executes a process of obtaining transaction data and storing the obtained transaction data into the distributed ledger. When processor 41 is to store new transaction data into the distributed ledger, processor 41 stores the new transaction data into ledger storage 42 in a scheme suitable for the type of the distributed ledger. Furthermore, processor 41 transmits or receives communication data to or from ledger storage 42 included in another ledger server among ledger server 40A and others and causes that ledger server to store the new transaction data into its ledger storage 42 as well.

Transaction data that processor 41 stores into the distributed ledger includes commonization information expressed in a list format or in a code format.

Ledger storage 42 is a storage that stores the distributed ledger. Ledger storage 42 is similar to ledger storage 22 of ledger server 20A and others. The distributed ledger stored in ledger storage 42 stores transaction data that includes commonization information expressed in a list format or in a code format.

Executor 43 is a functional unit that refers to transaction data recorded in the distributed ledger stored in ledger storage 42 and executes a process. Executor 43 is similar to executor 23 of ledger server 20A and others. Executor 43 may be implemented as a processor (e.g., a CPU) included in ledger server 40A executes a program with the use of a memory. In this example, executor 43 executes a process in accordance with a code in a smart contract included in transaction data stored in the distributed ledger.

Specifically, when transaction data including a command that causes a process pertaining to the contract with Company A to be executed has become stored in the distributed ledger, executor 43 executes the process pertaining to the contract in accordance with the command. Moreover, when transaction data including a command that causes a process pertaining to the contract with Company B to be executed has become stored in the distributed ledger, executor 43 executes the process pertaining to the contract in accordance with the command.

Display controller 44 is a functional unit that performs control for displaying commonization information. In response to receiving request information for causing commonization information to be displayed from terminal 50, display controller 44 transmits, to terminal 50, control information for displaying the commonization information in accordance with the received request information. Control information includes, for example, information describing an image that represents commonization information in HyperText Markup Language (HTML). In response to receiving control information, terminal 50 causes an image rendered by the received control information to be displayed on a display screen of terminal 50. In this example, display controller 44 may transmit in advance, to terminal 50, display control information for displaying an image via which terminal 50 receives an input of a search condition from the user.

In the following section, information to be used to analyze a smart contract and information to be used to generate commonization information will be described.

FIG. 8 is an explanatory diagram illustrating an example of a function table according to the present embodiment.

The function table illustrated in FIG. 8 is referred to by analyzer 11 when analyzer 11 causes a providing function in a smart contract to be executed.

The function table includes, for each item of information to be provided by a smart contract, names of providing functions that output corresponding item of information.

For example, the function table includes getValue, getPrice, getReward, and getFee as the names of a function that provides a price. Moreover, for example, the function table includes getTime and getDate as the names of a function that provides an agreed date of delivery.

The names of the providing functions indicated in the function table may be provided as names of function that provide corresponding items of information with these names associated with smart contracts. In this case, analyzer 11 causes a providing function in a smart contract to be executed by use of the name of the providing function indicated in the function table.

Moreover, the names of the providing functions indicated in the function table may each be a name determined in advance as the name of a function with, in general, a relatively high probability of providing corresponding information. In this case, analyzer 11 extracts, from functions published as functions included in a smart contract, a function having a name including a part of or the whole of the name of the providing function and causes the providing function in the smart contract to be executed with the extracted function treated as the providing function.

FIG. 9 is an explanatory diagram illustrating an example of a template of a commonization code according to the present embodiment.

The template of a commonization code illustrated in FIG. 9 is used when commonizer 12 generates a commonization code.

The template of a commonization code illustrated in FIG. 9 is a template that can generate a contract code written in a predetermined programming language by plugging in a character or characters in a blank space (an empty space).

Specifically, the character string indicating the name of the smart contract is written as "Contract%%%" including the blank "%%%" in FIG. 9. Meanwhile, the name of a variable is expressed with the blank "$$$".

Commonizer 12 replaces the blank "%%%" with an identifier that can uniquely identify the commonization code. For example, the blank "%%%" may be replaced by "A1" in the contract code corresponding to the result of analyzing the contract code of the contract concluding process with Company A. In a similar manner, the blank "%%%" may be replaced by "B1" in the contract code corresponding to the result of analyzing the contract code of the contract concluding process with Company B.

Commonizer 12 replaces the blank "$$$" with information indicating the price obtained as the result of the analysis performed by analyzer 11.

In this manner, commonizer 12 generates a commonization code.

FIG. 10 is an explanatory diagram illustrating an example of a language table according to the present embodiment.

The language table illustrated in FIG. 10 is referred to by commonizer 12 when commonizer 12 disassembles a binary code of a smart contract.

The language table includes, for each ledger network, a programming language of a contract code used in that ledger network.

For example, the language table indicates that the programming language of the contract code used in ledger network 20 is the Solidity language. Meanwhile, the language table indicates that the programming language of the contract code used in ledger network 30 is the Go language.

Commonizer 12 determines the programming language of the contract code by referring to the language table and executes disassembly in a method suitable for the determined programming language.

FIG. 11 is an explanatory diagram illustrating an example of a conversion table according to the present embodiment.

The conversion table illustrated in FIG. 11 is used when commonizer 12 converts, into a commonization code, a source code obtained through disassembly of a binary code performed by analyzer 11.

FIG. 11 shows codes in the Solidity language and codes in the Go language mapped to each other.

For example, "Contract ###{ }" in the Solidity language is mapped to "package ###" in the Go language. In this example, "###" is a metacharacter representing any desired character string.

With the use of this correspondence relationship, commonizer 12 can convert the Solidity language to the Go language or convert the Go language to the Solidity language. In other words, in a case where the language of a commonization code is the Solidity language, commonizer 12 can obtain a commonization code by converting the contract code written in the Go language into the contract code written in the Solidity language.

FIG. 12 is an explanatory diagram illustrating an example of commonization information according to the present embodiment.

The commonization information illustrated in FIG. 12 is commonization information in a list format to be obtained by commonizer 12.

The commonization information indicates in a list format, for each seller, the price serving as a parameter pertaining to the contract with the given seller and the address of the smart contract corresponding to the contract with the seller.

Specifically, FIG. 12 shows Company A and Company B as sellers and indicates that the monetary amounts that the user is to pay to Company A and Company B in the respective contracts are 100 yen and 110 yen, respectively. Moreover, FIG. 12 shows the addresses of the smart contracts corresponding to the respective contracts.

Now, a commonization code will be described with reference to FIG. 13 and FIG. 14. In the case described below, codes written in the Solidity language are employed as examples of a commonization code. The commonization code illustrated in this example is a commonization code that commonizer 12 has generated so as to output information obtained by use of a providing function or a commonization code that commonizer 12 has generated by converting a source code obtained through disassembly.

FIG. 13 is an explanatory diagram illustrating a first example of a commonization code according to the present embodiment.

Commonization code C3 shown in FIG. 13 is a commonization code of a process pertaining to the contract with Company A.

Commonization code C3 expresses, in the form of a commonization code, contract code C1 of the process pertaining to the contract with Company A illustrated in FIG. 2.

Commonization code C3 differs from contract code C1 of the process pertaining to the contract with Company A illustrated in FIG. 2 in that the name of the contract in commonization code C3 is "ContractA1". In other respects, commonization code C3 is the same as contract code C1 of the process pertaining to the contract with Company A illustrated in FIG. 2.

Contract code C1 is written in the Solidity language, and thus commonization code C3 that is also written in the Solidity language is the same as contract code C1.

FIG. 14 is an explanatory diagram illustrating a second example of a commonization code according to the present embodiment.

Commonization code C4 shown in FIG. 14 is a commonization code of a process pertaining to the contract with Company B.

Commonization code C4 expresses, in the form of a commonization code, contract code C2 of the process pertaining to the contract with Company B illustrated in FIG. 3.

Commonization code C4 describes an algorithm substantially identical to the algorithm in contract code C2 but differs from contract code C2. Contract code C2 is written in the Go language, and thus commonization code C4 written in the Solidity language differs from contract code C2.

FIG. 15 is an explanatory diagram illustrating an example of an address list according to the present embodiment.

The address list shown in FIG. 15 is a list indicating the addresses of the smart contracts corresponding to the commonization codes. The address list indicates the address of a smart contract corresponding to a given commonization code when commonizer 12 has generated the commonization code and stored the generated commonization code into the distributed ledger. The address list includes transaction data stored in ledger storage 42.

FIG. 15 shows the addresses of the smart contracts corresponding to the commonization codes indicating the contract with Company A and the contract with Company B.

In response to receiving transaction data that includes a command to execute a smart contract of a process pertaining to a contract from terminal 50, executor 43 searches and locates, in the address list, the seller with which the contract has been concluded based on the received transaction data. Then, executor 43 transfers the contract transaction data to the address of the seller located through the search.

FIG. 16 is an explanatory diagram illustrating image 51, which is an example of an image for performing a search according to the present embodiment.

Image 51 is an image that terminal 50 generates and displays based on display control information generated by display controller 44. Image 51 is an image for receiving a condition concerning matters related to the contract. In other words, image 51 is an image for receiving a condition concerning a search for an appropriate seller.

Image 51 includes conditions concerning matters related to the contract. Specifically, image 51 includes column 52 that receives, from the user, an input of the name, the price, and the agreed date of delivery of an article. The user can input conditions concerning matters related to the contract into column 52.

Image 51 further includes button 53 for causing a search to be executed based on the conditions that the user has input and for obtaining the result of the search. In response to button 53 being operated, terminal 50 generates request data that includes, as a search condition, information that has been input into column 52 up to the point when button 53 was operated and transmits the generated request data to ledger server 40A. In response to receiving the request data, ledger server 40A executes a search process on the transaction data stored in the distributed ledger based on the search condition indicated by the received request data and obtains a seller or sellers that satisfy the search condition and information indicating the terms of the sale. Ledger server 40A transmits display control information for displaying the seller or sellers and the terms of the sale to terminal 50.

FIG. 17 is an explanatory diagram illustrating image 61, which is a first example of an image for displaying a search result according to the present embodiment.

Image 61 is an example of an image that terminal 50 displays in response to button 53 for a search having been operated in image 51 illustrated in FIG. 16, that is, in image 51 in which "ABC" has been input for the name.

Image 61 is an image that displays, as commonization information, information indicating the result of the search for an article with the name "ABC".

Image 61 includes column 62 showing the sellers and column 63 showing the prices. In addition, image 61 displays, for each seller, button 64 for concluding a contract with the given seller.

In one conceivable case, the user, looking at image 61, decides whether the user is to conclude a sales and purchase contract concerning the purchase of an article with Company A or Company B (i.e., whether the user is to purchase the article from Company A or Company B) and operates button 64 for concluding the contract associated with the seller that the user has decided on. In response to button 64 for concluding the contract being operated, terminal 50 generates transaction data that includes a command to execute a smart contract pertaining to the contract with the seller corresponding to operated button 64 and transmits the generated transaction data to ledger server 40A.

In this example, the search result may be displayed in a commonization code serving as commonization information.

FIG. 18 is an explanatory diagram illustrating image 71, which is a second example of an image for displaying a search result according to the present embodiment.

Image 71 is an image that displays, in the form of a commonization code, information indicating a search result for an article.

Image 71 includes column 72 showing the sellers and column 73 showing the commonization codes. In addition, image 71 displays, for each seller, button 74 for concluding a contract with the given seller.

In one conceivable case, the user, looking at image 71 and examining the commonization code, decides whether the user is to conclude a sales and purchase contract concerning the purchase of an article with Company A or Company B and operates button 74 for concluding a contract associated with the seller that the user has decided on. The process performed in response to button 74 for concluding the contract having been operated is similar to the description given with reference to FIG. 17.

A process of analysis device 10 configured as described above will now be described.

Figure 19:
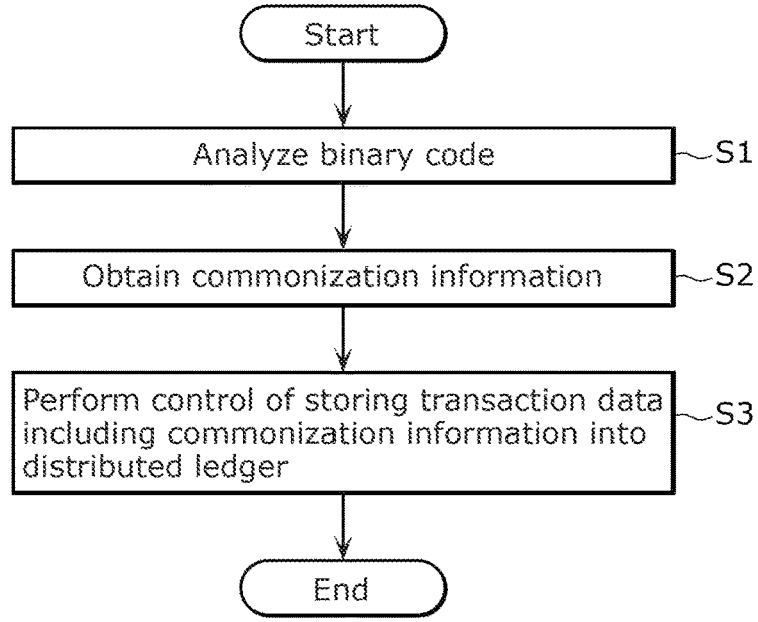
FIG. 19 is a flowchart illustrating a process of an analysis device according to one exemplary embodiment.

FIG. 19 is a flowchart illustrating a process of analysis device 10 according to the present embodiment.

As illustrated in FIG. 19, at step S1, analyzer 11 analyzes a binary code of each of a plurality of smart contracts stored in the distributed ledger.

At step S2, using the result of the analysis performed at step S1, commonizer 12 obtains items of commonization information expressing, in a common format, information provided the respective smart contracts.

At step S3, outputter 13 generates transaction data that includes the items of commonization information obtained at step S2 and performs controls of storing the generated transaction data into the distributed ledger (corresponding to a second distributed ledger). The distributed ledger into which the transaction data is stored is, for example, the distributed ledger of ledger server 40A or can be the distributed ledger of ledger server 20A or the distributed ledger of ledger server 30A.

Through the series of processes illustrated in FIG. 19, analysis device 10 suppresses an increase in power consumed by a computer system managing a contract.

In the following section, the processes illustrated in FIG. 19 will be described in further detail.

Figure 20:
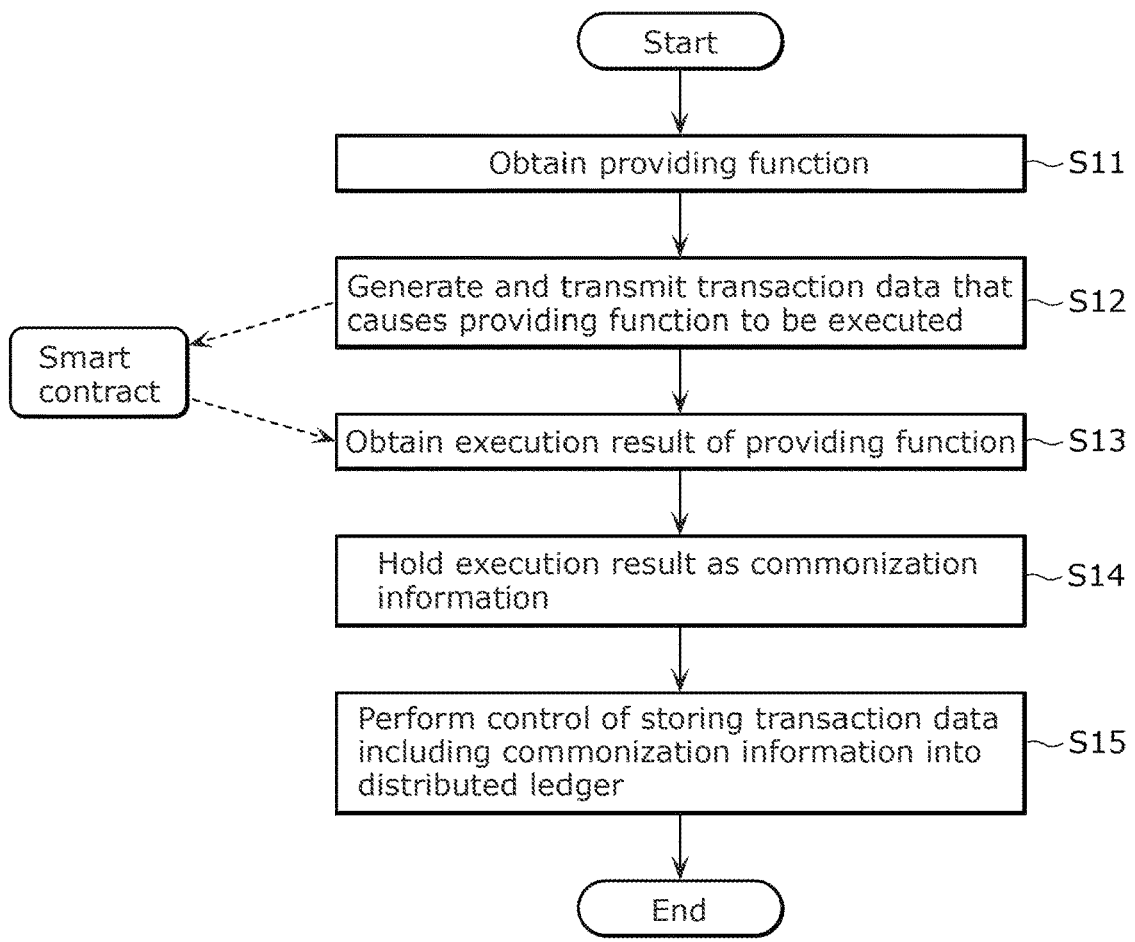
FIG. 20 is a flowchart illustrating a first example of a detailed process of an analysis device according to one exemplary embodiment.

FIG. 20 is a flowchart illustrating a first example of a detailed process of analysis device 10 according to the present embodiment.

As illustrated in FIG. 20, at step S11, analyzer 11 obtains a providing function included in a smart contract.

At step S12, analyzer 11 generates transaction data that includes a command that causes the providing function obtained at step S11 to be executed and transmits the generated transaction data to the ledger server (i.e., ledger server 20A or ledger server 30A) that stores the smart contract. In response to receiving the transaction data, the ledger server stores the received transaction data into the distributed ledger and executes the providing function. The ledger server transmits information indicating the result obtained by executing the providing function (also referred to simply as an execution result) to analysis device 10.

At step S13, analyzer 11 obtains the execution result transmitted by the ledger server at step S12.

At step S14, commonizer 12 holds the execution result obtained at step S13 as commonization information.

At step S15, outputter 13 generates transaction data that includes items of commonization information obtained at step S2 and stores the generated transaction data into the distributed ledger (corresponding to a second distributed ledger) of ledger server 40A.

In this example, steps S11 to S13 correspond to step S1 of FIG. 19, step S14 corresponds to step S2 of FIG. 19, and step S15 corresponds to step S3 of FIG. 19.

Through the series of processes illustrated in FIG. 20, analysis device 10 suppresses an increase in power consumed by a computer system managing a contract.

Figure 21:
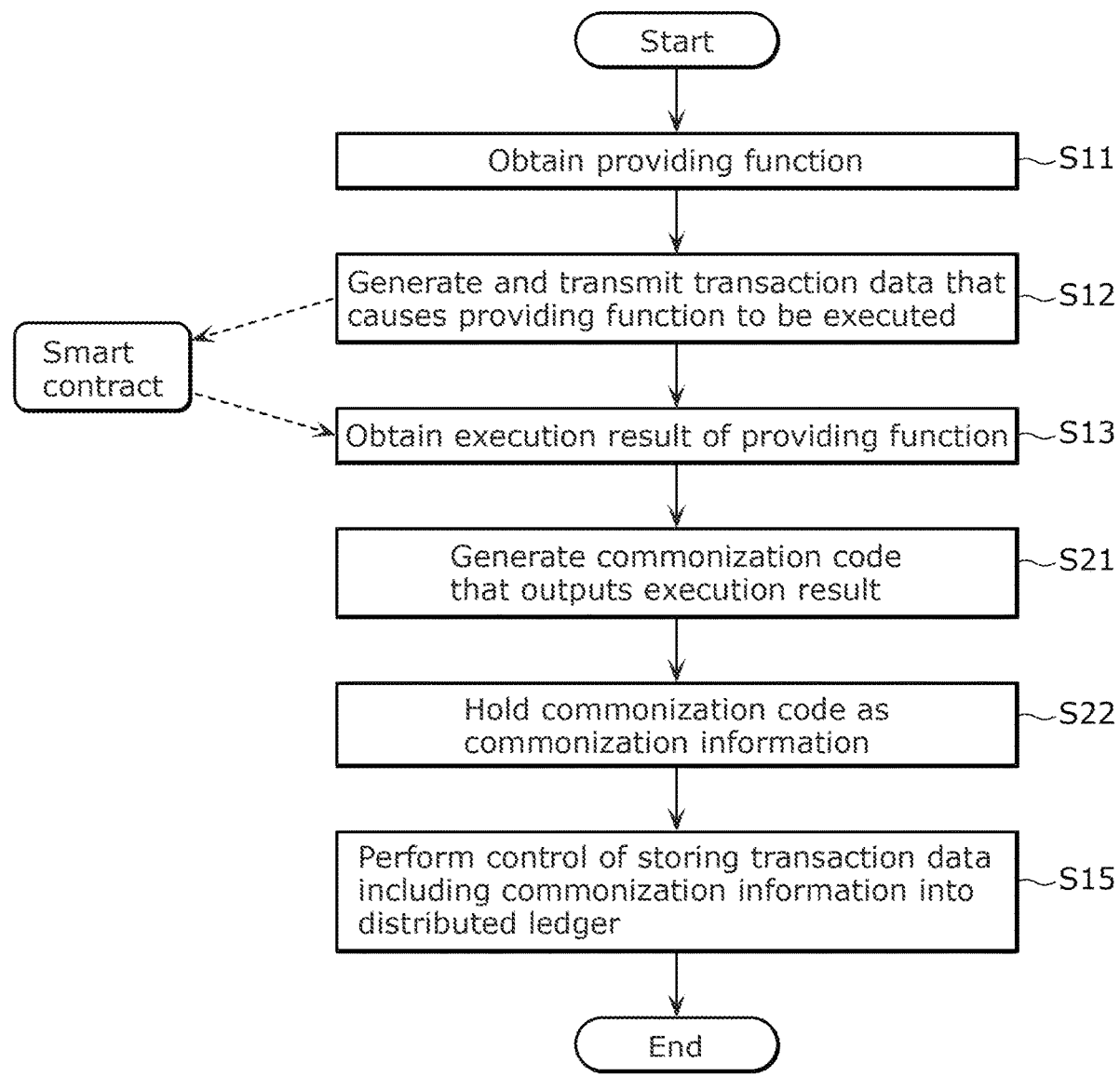
FIG. 21 is a flowchart illustrating a second example of a detailed process of an analysis device according to one exemplary embodiment.

FIG. 21 is a flowchart illustrating a second example of a detailed process of analysis device 10 according to the present embodiment.

Step S11 to S13 and step S15 shown in FIG. 21 are the same as the respective steps with the same step numbers shown in FIG. 20.

At step S21, commonizer 12 generates a commonization code that is a contract code for outputting the execution result obtained at step S13.

At step S22, commonizer 12 holds the commonization code obtained at step S21 as commonization information.

In this example, steps S21 and S22 correspond to step S2 of FIG. 19.

Through the series of processes illustrated in FIG. 21, analysis device 10 suppresses an increase in power consumed by a computer system managing a contract.

Figure 22:
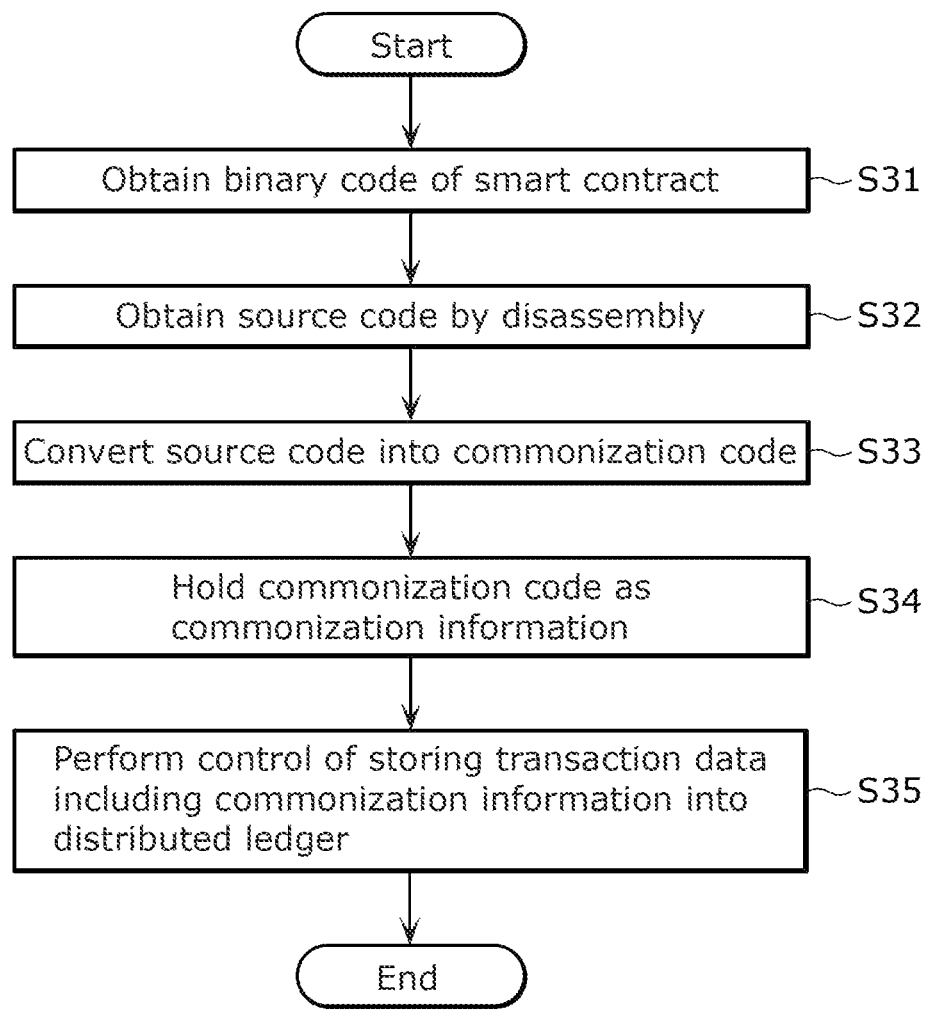
FIG. 22 is a flowchart illustrating a third example of a detailed process of an analysis device according to one exemplary embodiment.

FIG. 22 is a flowchart illustrating a third example of a detailed process of analysis device 10 according to the present embodiment.

At step S31, analyzer 11 obtains a binary code of a smart contract.

At step S32, analyzer 11 obtains a source code by disassembling the binary code obtained at step S31.

At step S33, commonizer 12 converts the source code obtained at step S32 into a commonization code.

At step S34, commonizer 12 holds the commonization code obtained at step S33 as commonization information.

At step S35, outputter 13 generates transaction data that includes items of commonization information obtained at step S34 and stores the generated transaction data into the distributed ledger (corresponding to a second distributed ledger) of ledger server 40A.

In this example, steps S31 and S32 correspond to step S1 of FIG. 19, steps S33 and S34 correspond to step S2 of FIG. 19, and step S35 corresponds to step S3 of FIG. 19.

Through the series of processes illustrated in FIG. 22, analysis device 10 suppresses an increase in power consumed by a computer system managing a contract.

Next, a process of contract managing system 1 that includes analysis device 10 will be described.

Figure 23:
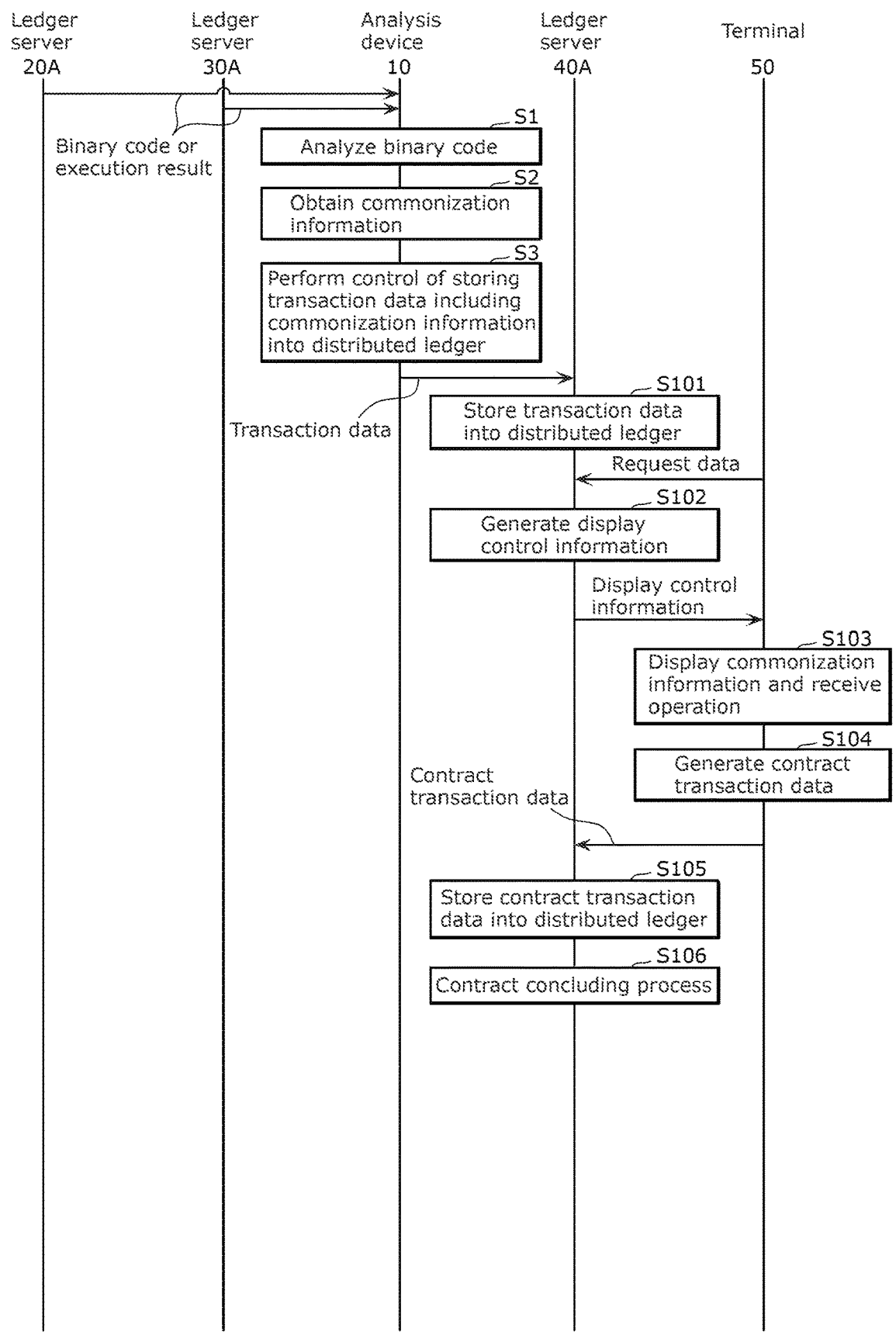
FIG. 23 is a sequence diagram illustrating a first example of a process of a contract managing system according to one exemplary embodiment.

FIG. 23 is a sequence diagram illustrating a first example of a process of contract managing system 1 according to the present embodiment. The sequence diagram illustrated in FIG. 23 shows a process performed when ledger server 40A stores commonization information in a code format (i.e., a commonization code) into the distributed ledger.

In this example, the processing steps described earlier are given the same step numbers, and detailed description thereof will be omitted.

At steps S1 to S3, analysis device 10 analyzes each binary code, obtains commonization information, and performs control of storing transaction data into the distributed ledger of ledger server 40A. The control of storing the transaction data into the distributed ledger of ledger server 40A includes transmitting the transaction data to ledger server 40A.

At step S101, ledger server 40A receives the transaction data transmitted at step S3 and stores the received transaction data into the distributed ledger.

Thereafter, terminal 50 may transmit, to ledger server 40A, a request for obtaining commonization information. At this point, ledger server 40A may transmit in advance, to terminal 50, display control information for causing information for searching sellers to be displayed, and based on this display control information, terminal 50 may display the information for searching the sellers. In this case, the request from terminal 50 may be transmitted upon the user visually examining the displayed information and inputting a search condition into terminal 50.

At step S102, in response to receiving the request from terminal 50, ledger server 40A generates the display control information and transmits the generated display control information to terminal 50.

At step S103, terminal 50 receives the display control information transmitted at step S102 and displays commonization information based on the received display control information. Moreover, terminal 50 receives an operation performed on the displayed commonization information. The operation performed on the displayed commonization information is, for example, an operation performed on a contract concluding button associated with one of the contracts indicated by the displayed commonization information.

At step S104, in response to receiving the operation performed at step S103, terminal 50 transmits, to ledger server 40A, contract transaction data that executes a contract concluding process of concluding the contract associated with the operation.

At step S105, ledger server 40A receives the contract transaction data transmitted at step S104 and stores the received contract transaction data into the distributed ledger.

At step S106, ledger server 40A executes the contract concluding process in response to storing the contract transaction data into the distributed ledger at step S105.

Figure 24:
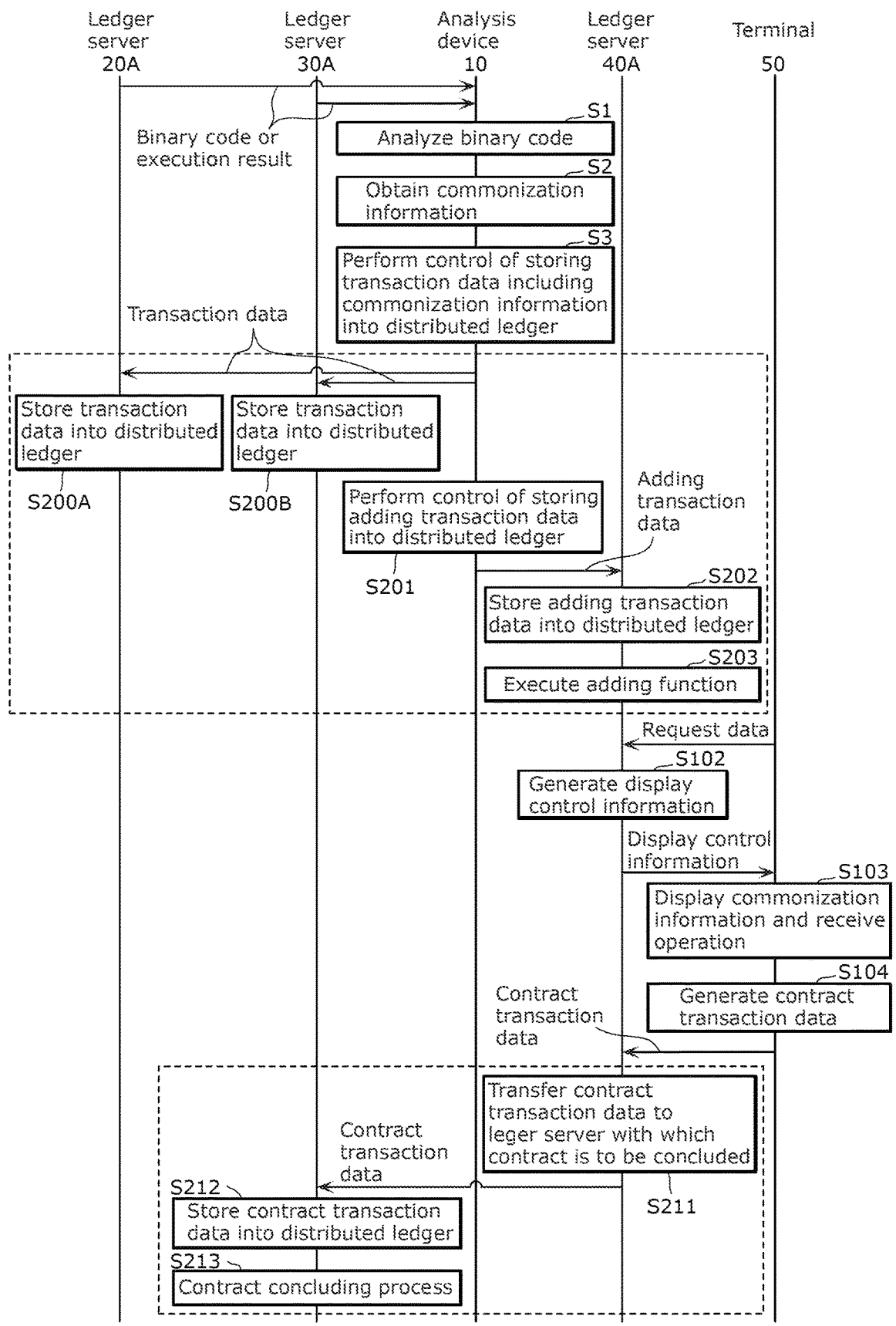
FIG. 24 is a sequence diagram illustrating a second example of a process of a contract managing system according to one exemplary embodiment.

FIG. 24 is a sequence diagram illustrating a second example of a process of contract managing system 1 according to the present embodiment. The sequence diagram illustrated in FIG. 24 shows a process performed when ledger servers 20A and 30A each store commonization information in a list format into its distributed ledger.

The processes enclosed by the dashed lines in FIG. 24 are the differences from the processes shown in FIG. 23. In the following section, the processes that differ from those shown in FIG. 23 will mainly be described. In this example, the processing steps described earlier are given the same step numbers, and detailed description thereof will be omitted.

At steps S1 to S3, analysis device 10 analyzes each binary code, obtains commonization information, and performs control of storing the transaction data into the distributed ledger of each of ledger servers 20A and 30A. The control of storing the transaction data into the distributed ledger of each of ledger servers 20A and 30A includes transmitting the transaction data to each of ledger servers 20A and 30A.

At step S200A, ledger server 20A receives the transaction data transmitted at step S3 and stores the received transaction data into the distributed ledger.

At step S200B, ledger server 30A receives the transaction data transmitted at step S3 and stores the received transaction data into the distributed ledger.

At step S201, outputter 13 of analysis device 10 performs control of storing transaction data that executes an adding function (also referred to as adding transaction data) into the distributed ledger of ledger server 40A. The control of storing the adding transaction data into the distributed ledger of ledger server 40A includes transmitting the adding transaction data to ledger server 40A. The adding transaction data includes a command for adding, into an address list, the address of a smart contract stored in ledger server 20A and the address of a smart contract stored in ledger server 30A.

At step S202, ledger server 40A receives the adding transaction data transmitted at step S201 and stores the received adding transaction data into the distributed ledger.

At step S203, in response to storing the adding transaction data into the distributed ledger at step S202, ledger server 40A adds, to the address list, the address of the smart contract stored in ledger server 20A and the address of the smart contract stored in ledger server 30A.

At step S211, ledger server 40A receives the contract transaction data transmitted at step S104. Referring to the address list, ledger server 40A searches the ledger server that stores the smart contract pertaining to the contract concluding process with the seller with which the contract is to be concluded. When the seller with which the contract is to be concluded is Company B, the aforementioned search yields the address of the smart contract stored in ledger server 30A. Ledger server 40A transfers the received contract transaction data to the address obtained through the search.

At step S212, ledger server 30A receives the contract transaction data transmitted at step S211 and stores the received contract transaction data into the distributed ledger.

At step S213, ledger server 30A executes the smart contract pertaining to the contract in response to storing the contract transaction data into the distributed ledger at step S212, and thus ledger server 30A executes the contract concluding process.

Supplementation

Supplemental description will be provided regarding the blockchain according to the foregoing embodiment or its variations.

Figure 25:
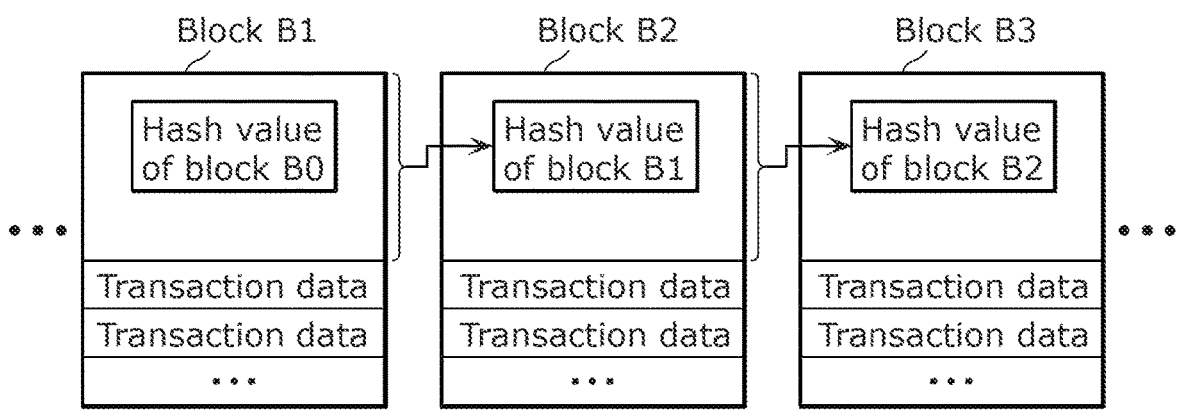
FIG. 25 is an explanatory diagram for illustrating a data structure of a blockchain.

FIG. 25 is an explanatory diagram for illustrating a data structure of a blockchain.

A blockchain is composed of blocks, each serving as a recording unit of the blockchain, connected in a chain-like manner. Each of the blocks includes a plurality of items of transaction data and the hash value of the block immediately preceding itself. Specifically, block B2 includes the hash value of block B1 preceding block B2. Then, the hash value calculated based on the plurality of items of transaction data included in block B2 and the hash value of block B1 is incorporated into block B3 as the hash value of block B2. In this manner, as the contents of the preceding block are incorporated and as the blocks are connected in a chain-like manner, any alteration of the recorded transaction data can be prevented effectively.

If past transaction data is modified, the hash value of the modified block takes a value different from the value held before the modification. Therefore, in order to make an altered block appear as if no alteration had been made, all the blocks following the altered block need to be recreated, and such an operation is very difficult in reality. The use of this property can ensure that a blockchain is hard to alter.

Figure 26:
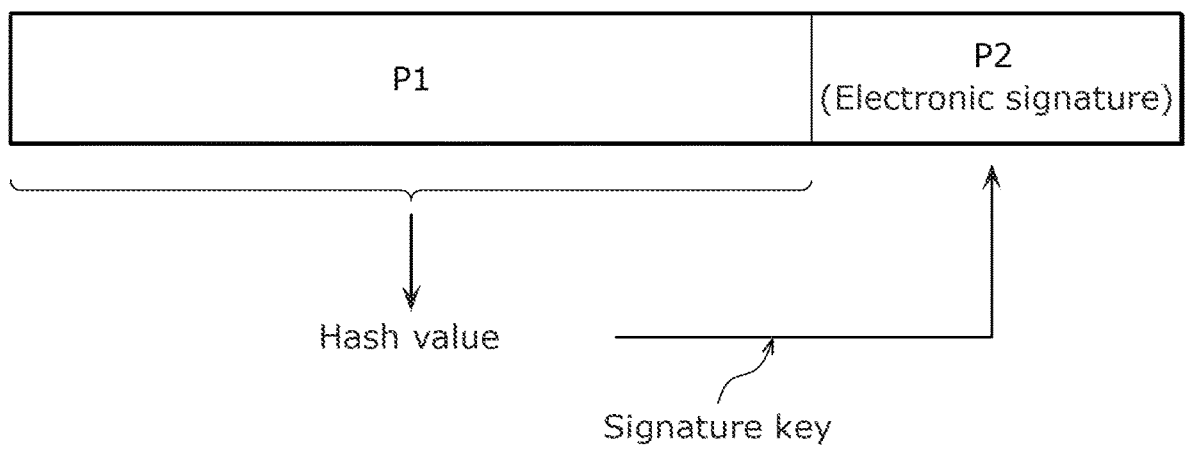
FIG. 26 is an explanatory diagram illustrating a data structure of transaction data.

FIG. 26 is an explanatory diagram illustrating a data structure of transaction data.

The transaction data illustrated in FIG. 26 includes transaction body P1 and electronic signature P2. Transaction body P1 is a data body included in the transaction data. Electronic signature P2 is generated as the hash value of transaction body P1 is signed with a signature key of the creator of the transaction data, or more specifically, as the hash value of transaction body P1 is encrypted by a private key of the creator.

Since the transaction data includes electronic signature P2, it is virtually impossible to alter the transaction data. This property can keep the transaction body from being altered.

In the foregoing embodiment, the constituent elements may each be implemented by dedicated hardware or through execution of a software program suitable for the corresponding constituent element. The constituent elements may each be implemented as a program executing unit, such as a CPU or a processor, reads out a software program recorded on a recording medium, such as a hard disk or a semiconductor memory, and executes the software program. Herein, the software that implements the contract managing system and others according to the foregoing embodiment is a program such as the one described below.

Specifically, this program causes a computer to execute a control method to be executed by one device among a plurality of devices in a contract managing system that includes the plurality of devices each including a distributed ledger, and the control method includes: obtaining first transaction data including a first variable and a second variable, the first variable indicating first information pertaining to a first contract between a first user and a second user, the second variable indicating second information different from the first information pertaining to the first contract and having set therein a predetermined value indicating that the second information has not been determined; storing the first transaction data obtained into the distributed ledger; executing a storing process of reading out the second variable included in the first transaction data stored in the distributed ledger and storing the second variable into a rewritable storage of the one device; obtaining second transaction data including a third variable and a change command, the third variable indicating third information pertaining to a second contract between the first user and a third user, the change command changing the second variable based on the third variable; storing the second transaction data obtained into the distributed ledger; and executing a changing process after storing the second transaction data into the distributed ledger, the changing process changing the second variable stored in the storage from the predetermined value in accordance with the change command.

Thus far, the contract managing system and others according to one or more aspects have been described based on the embodiment, but the present disclosure is not limited to this embodiment. Unless departing from the spirit of the present disclosure, an embodiment obtained by making various modifications that are conceivable by a person skilled in the art to the present embodiment or an embodiment obtained by combining the constituent elements in different embodiments may also be encompassed by the scope of the one or more aspects.

INDUSTRIAL APPLICABILITY

The present disclosure can be used in a contract managing system that manages a contract.

The invention claimed is:
1. A control method comprising:
analyzing a binary code of each of a plurality of smart contracts stored in a first distributed ledger, the analyzing including disassembling the binary codes of the plurality of smart contracts and obtaining a plurality of source codes;
obtaining, by using a result of the analyzing, items of commonization information expressing, in a common format, items of information provided by the plurality of smart contracts, the items of commonization information including a plurality of commonization codes expressing, in the common format, the plurality of source codes obtained; and
generating transaction data that includes the items of commonization information obtained and performing control of storing the transaction data generated into a second distributed ledger.
2. The control method according to claim 1, wherein
the analyzing includes causing functions in the plurality of smart contracts to be executed, and
the obtaining of the items of commonization information includes obtaining, as the items of commonization information, items of information provided by the functions executed.
3. The control method according to claim 2, wherein
the analyzing includes extracting, from functions in the plurality of smart contracts, a function having a name determined in advance as a name of a function with a relatively high probability of providing the information, and causing the function extracted to be executed.
4. The control method according to claim 1, wherein
the obtaining of the items of commonization information includes obtaining the plurality of commonization codes by converting the plurality of source codes obtained, in accordance with a predetermined code conversion rule.
5. The control method according to claim 1, wherein
the generating of the transaction data includes generating the transaction data that includes the items of commonization information in a format in which, for each of the plurality of the smart contracts, an identifier of the smart contract is associated with, among the items of commonization information, commonization information pertaining to the smart contract.

6. The control method according to claim 1, wherein the generating of the transaction data includes generating the transaction data that includes the items of commonization information in a format in which, for each of the plurality of smart contracts, an identifier of the smart contract is associated with, among the plurality of commonization codes, a commonization code pertaining to the smart contract.

7. The control method according to claim 5, further comprising:
causing the transaction data stored in the second distributed ledger to be read out; and
causing the items of commonization information pertaining to the plurality of smart contracts to be displayed.

8. The control method according to claim 7, wherein each of the plurality of the smart contracts corresponds to a contract concluding process, and
the control method further comprises causing, for each of the plurality of smart contracts, a button to be displayed that causes the contract concluding process associated with the smart contract to be executed.

9. The control method according to claim 8, further comprising:
in response to obtaining operation information indicating that the button has been operated on, causing the contract concluding process corresponding to the smart contract associated with the button to be executed.

10. An analysis device comprising:
an analyzer that performs an analysis of a binary code of each of a plurality of smart contracts stored in a first distributed ledger, the analysis including disassembling the binary codes of the plurality of smart contracts and obtaining a plurality of source codes;
a commonizer that obtains, by using a result of the analysis, items of commonization information expressing, in a common format, items of information provided by the plurality of smart contracts, the items of commonization information including a plurality of commonization codes expressing, in the common format, the plurality of source codes obtained; and
an outputter that generates transaction data that includes the items of commonization information obtained and performs control of storing the transaction data generated into a second distributed ledger.

11. A non-transitory computer-readable recording medium having recorded thereon a computer program for causing a computer to execute the control method according to claim 1.

\* \* \* \* \*